L. A. COLEMAN.
TIRE FOR VEHICLE WHEELS.
APPLICATION FILED JUNE 20, 1910.
985,397.
Patented Feb. 28, 1911.
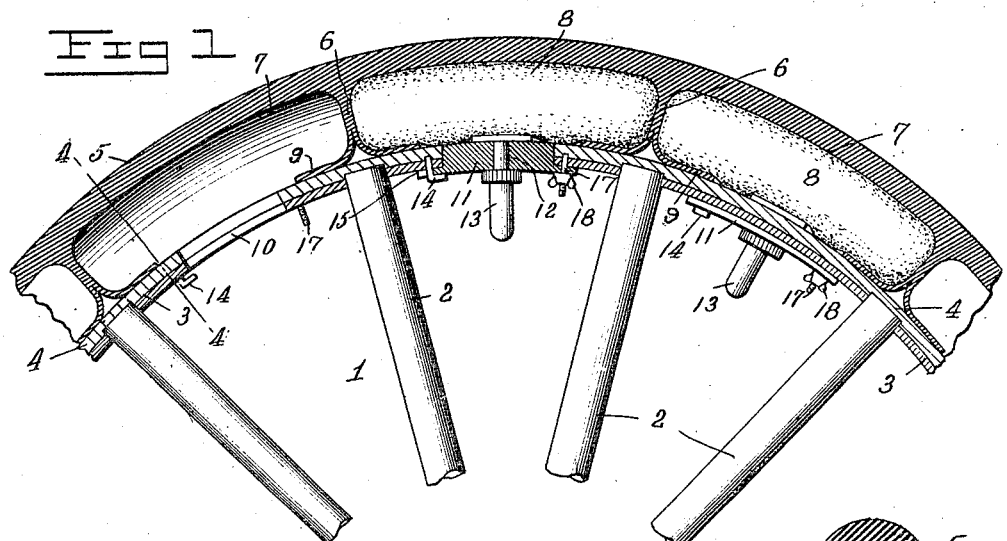
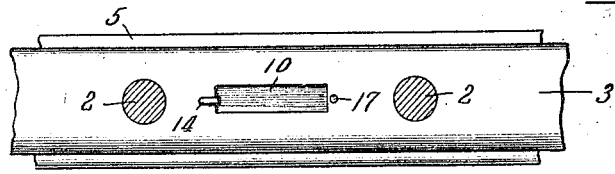
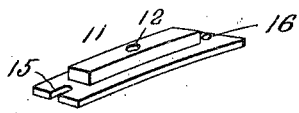
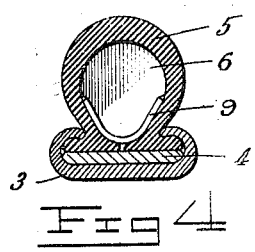
Inventor
Lewis A. Coleman
Witnesses
By Meyers, Cushman & Rea
Attorney

UNITED STATES PATENT OFFICE.

LEWIS A. COLEMAN, OF NORFOLK, VIRGINIA, ASSIGNOR OF ONE-THIRD TO HUGH G. WHITEHEAD, OF NORFOLK, VIRGINIA.

TIRE FOR VEHICLE-WHEELS.

985,397.

Specification of Letters Patent.  Patented Feb. 28, 1911.

Application filed June 20, 1910. Serial No. 568,048.

*To all whom it may concern:*

Be it known that I, LEWIS A. COLEMAN, a citizen of the United States, residing at Norfolk, in the county of Norfolk and State of Virginia, have invented new and useful Improvements in Tires for Vehicle-Wheels, of which the following is a specification.

My invention relates to improvements in multiple-chamber pneumatic tires for vehicles and has for its object to insure, in the event of injury to one or more pneumatic units, the integrity of the others. Heretofore in such type of tires it has been proposed to dispose the pneumatic units in annular series within the outer casing of the tire in contact with each other, or to separate them by walls which are in part, at least, movable; and in both such arrangemens should be a unit be punctured and collapse, there is danger that the remaining units, which are of thin rubber, will, having no adequate end support, under the great pressure of the contained air, burst. It has also been proposed to have the divisional walls immovable, but such arrangement has embodied a construction which detracts from the resiliency of the tire. By my invention I provide a tire of this class in which the pneumatic units are disposed in chambers in the outer casing and separated from each other by division walls which in practice so support the ends of the several units that should one be injured, by puncturing or otherwise, the injury will be confined thereto, and this is accomplished without detracting from the desired resiliency of the tire.

With these objects in view the invention consists in the features hereinafter described, shown in the drawings, and pointed out in the claims.

In the said drawings: Figure 1 is a partial, sectional view of a wheel disclosing my invention, Fig. 2, an inner face of the wheel felly, Fig. 3 a perspective view of the cover for the opening in the felly, Fig. 4 is a cross-sectional view illustrating my invention as embodied in a well known type of outer casing adapted for a clencher rim.
Fig. 5 is a cross sectional view of the arrangement shown in Fig. 1 of the drawing taken upon the line 4—4 of Fig. 1.

Referring to the accompanying drawings, the reference numeral 1 designates generally a vehicle wheel, a partial view of which is shown in Fig. 1, 2 the spokes, 3 the rim or felly, 4 a wooden lining for the felly to receive the spokes.

5 designates the outer casing or shoe of the tire which may be composed of any of the known suitable materials, a combination of rubber and canvas, or other textile material being suitable. In Figs. 1 and 5 of the drawing one type of commonly known outer casing is shown, the longitudinal edges of which are engaged in the clencher elements of the rim, and in Fig. 4 another generally known type of casing is shown, the longitudinal edges of which engage with the clencher elements of the rim and are enlarged laterally, so that their edges stand close together when disposed for use upon the rim, and in this latter arrangement, if it be desired to introduce the pneumatic elements into their compartments through the hereinafter referred to openings through the rim, the enlarged longitudinal edges of the tire may be cut-away at intervals to register with such openings. In Fig. 1 of the drawing the flaps 9 of the division walls lie against the wooden lining of the felly, and in Fig. 4 against the inner wall of the casing. These are unimportant considerations, however, as my invention is not limited in those respects.

The casing 5 has interiorly arranged transverse division walls 6 that provide a series of separate chambers or pockets 7. The number of the walls and the length of the chambers may be varied. The walls 6 may conveniently be vulcanized with the body of the casing 5 and consist of the same material, but are designed to be relatively thin and flexible. The walls 6, however, have sufficient "body" to enable the flaps 9 thereof to normally lie against the rim or felly, as shown in Fig. 1, or against the inner wall of the casing, as shown in Fig. 4, or against the inner wall of the tire casing as shown in Fig. 4, and yet will not detract in any wise from the resiliency of the tire, as would occur if they were relatively stiff, in which event there would be a series of relatively stiff partitions which would disturb the resiliency of the tire and cause a bumping action. These walls are designed to support the ends of the pneumatic units 8, hereinafter referred to. In the ordinary tire having an inner tube, the tube is composed of quite thin, delicate rubber, so that it will respond readily to the air compressed thereinto, and it is supported so that it may sustain this internal air pressure by the walls of the outer casing or shoe of the tire. The pneumatic units 8 forming part of my invention are of like material, and must have surrounding support. If the ends thereof were unsupported and any one of the units should be punctured and collapse, there would be danger that internal air pressure in the adjacent unit would burst that unit, and following thereupon like destruction of the units might occur throughout the series comprised in the tire. The walls 6 therefore, are provided to support the ends of the several units against the bursting tendency of the contained air. That these walls, while affording adequate support for the pneumatic units shall be extremely flexible and not disturb in any wise the resiliency of the tire, they are relatively thin, as shown. That they may hold the units against the bursting action referred to the walls are provided with lateral extensions or flaps 9 (that is to say, the walls are of sufficient area to completely separate the several pneumatic unit compartments and in addition thereto have flap extensions which serve an additional purpose) which, as shown in Fig. 1, lie between the rim or felly and the pneumatic units, and in Fig. 4 lie between the inner walls of the casing and the pneumatic units, so that when the latter are inflated the flaps are normally engaged thereby and held to maintain the divisional walls in proper position to support the inflatable units.

In order that a pneumatic unit may be quickly removed and a new one substituted in the event of injury, I prefer to provide openings through the wheel felly for the insertion and removal of such units, and, as shown in the drawing, openings 10 through the rim or felly are provided leading to the several chambers defined by the walls 6, so that, without in any wise disturbing the connection of the longitudinal edges of the tire with the outer rim, the pneumatic units may be removed and replaced quickly and easily, and without the necessity of any special tool or implement, or any particular skill. The openings 10 are closed by covers 11, which are provided with perforations, 12, through which the inflation nipples 13 of the pneumatic units pass and are exposed for connection of an inflating pump. The covers may be held in place by means of keepers 14 with which one end 15 of the covers are adapted to engage, the other ends of the covers being provided with openings 16 to engage screw-pins 17 carried by the rim or felly, and held on said screws by means of thumb-nuts 18.

It will be understood that my invention is not concerned with the manner of inserting or removing the units. I have merely illustrated a preferred arrangement for this purpose.

Having thus described my invention, what I claim as new and desire to secure by Letters Patent is:—

1. A tire for vehicle wheels comprising an outer casing provided with a plurality of interiorly arranged transverse division walls having lateral extension flaps, the free ends of which are disposed longitudinally of the tire, and a series of pneumatic units arranged in chambers provided by said walls and engaging said flaps.

2. An outer casing of a tire for vehicles provided with interiorly arranged transverse walls providing a series of chambers within said casing, said walls having lateral extension flaps, the free ends of which are disposed longitudinally of the tire.

In testimony whereof I have hereunto set my hand in presence of two subscribing witnesses.

LEWIS A. COLEMAN.

Witnesses:
 ARTHUR L. BRYANT,
 GEO. W. REA.